May 11, 1937.  J. MIHALYI  2,080,086
FOOTAGE INDICATOR FOR FILM MAGAZINES
Filed Aug. 31, 1934
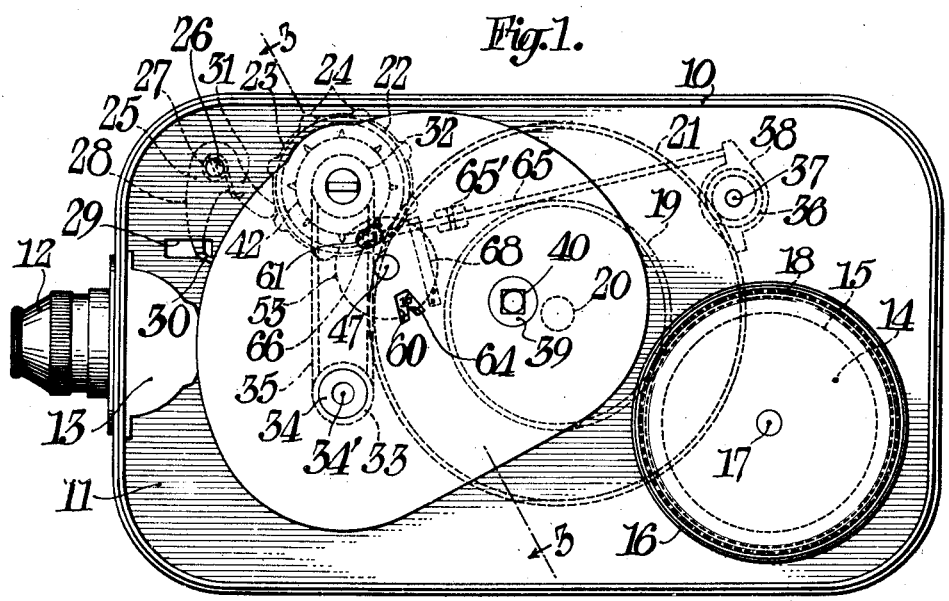
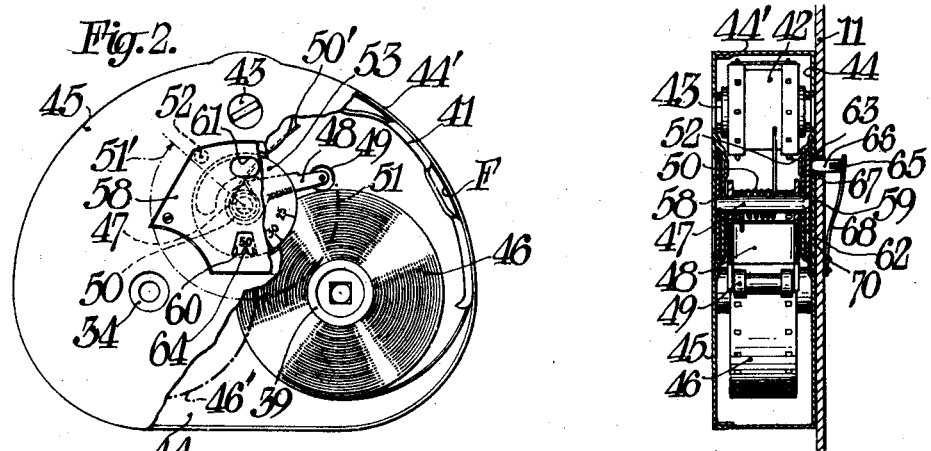
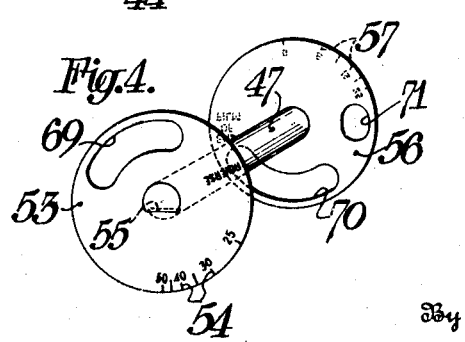
Inventor:
Joseph Mihalyi,
Newton M. Perkins
George A. Gillette, Jr.
Attorneys Patented May 11, 1937

2,080,086

UNITED STATES PATENT OFFICE 2,080,086

FOOTAGE INDICATOR FOR FILM MAGAZINES

Joseph Mihalyi, Rochester, N. Y., assignor, by mesne assignments, to Eastman Kodak Company, Jersey City, N. J., a corporation of New Jersey Application August 31, 1934, Serial No. 742,241

15 Claims. (Cl. 88—16)

The present invention relates to a footage indicator for motion picture film magazines and more particularly to a footage indicator which also enters into co-operation with a control means for supervising operation of a film driving mechanism.

Many types and designs of film footage indicators for film magazines are already known but such indicators do not cause, when moved to a predetermined position, blocking of the film moving mechanism. For this reason there must be intervention by the operator to shut down the mechanism after the supply film roll has become unwound.

Furthermore, the footage indicator of the present invention is adapted first to contact the outer convolution of one film roll within a magazine and then after said one film roll has been exhausted to make contact with the outer convolution of the other film roll. By proper planning, a single indicating means may be used designating the amount of film on either of these film rolls and in this manner the indicating means is considerably simplified.

The primary object of the present invention is the provision in a photographic apparatus of a film driving mechanism for moving the film within a magazine from one film roll to another in combination with an indicating means for designating the amount of film on either of said film rolls and control means for blocking the film driving mechanism when the diameter of the co-operating film roll has attained a predetermined value.

Another object of the present invention is the provision in a motion picture apparatus of a film magazine containing a supply of film to be partially exposed during each of two runs through the motion picture machine in combination with an indicating means having two members either of which may co-operate with control means to block a film driving mechanism when the diameter of one of said film rolls reaches a predetermined diameter.

A further object of the invention is the provision of a motion picture apparatus which is adapted to receive a film magazine either in an upright or inverted position, said magazine having an indicating means including a pair of members on opposite sides of the magazine, only one of said members being visible during either the upright or inverted position of the magazine in the camera.

Still another object of the invention is the provision of an indicating means including members adapted to co-operate alternatively with a control means for supervising blocking of a film driving mechanism, said members of the indicating means being displaced with respect to each other so that when one has moved to a position to permit movement of the control means to blocking position the other member is situated so as to move said control means out of blocking position. By virtue of this feature, the indicating means also functions as a safeguard to prevent improper location of the film magazine within the apparatus and to prevent double exposure of the film within the magazine.

Other and further objects of the invention will be suggested to those skilled in the art by the description which follows.

To these and other ends, the invention consists of certain parts and combinations of parts all to be hereinafter described, the novel features of the invention being pointed out in the appended claims. Reference is hereby made to the accompanying drawing wherein similar reference characters designate similar elements and herein:

Fig. 1 is a side view of a motion picture camera with its cover removed and containing a film magazine which is equipped with a film footage indicating means according to the invention.

Fig. 2 is a plan view of a film magazine having an indicating means and with its cover partially broken away for better illustration of the internal parts.

Fig. 3 is a cross-section through a film magazine and footage indicator according to the invention and is taken on the line 3—3 of Fig. 1.

Fig. 4 is a perspective view in detail of the graduated members of the indicating means.

The indicating means of the invention and its cooperation with the film driving mechanism has been illustrated with respect to a motion picture camera. It is here pointed out and it is to be clearly and definitely understood that this invention is applicable with equal advantages to all types of motion picture and photographic equipment. The present illustration of the invention in connection with a motion picture camera is in no way intended and should not constitute any limitation upon the scope of the invention. Those skilled in the art can readily adapt the features of this invention to other types of film magazines for uses in other types of apparatus such as ordinary cameras, projectors, printers, etc.

One possible application or appropriate setting for the invention is its use in a motion picture camera. Such a camera may be of conventional design and may include a casing 10 which is longitudinally divided by a mechanism plate 11 to provide a mechanism chamber and a magazine chamber. An objective 12 is affixed externally to the front of casing 10 and a shutter housing 13 is located within casing 10 in alignment with objective 12.

The potential energy for operating the film driving mechanism is stored in a spring motor 14. Said spring motor 14 is enclosed within a drum 15 which is attached to casing 10 and which extends into a housing 16 formed on mechanism plate 11. A spindle 17 extends centrally through the spring motor 14 and the drum 15 and is attached to a pinion gear 18. The spring within spring motor 14 has not been illustrated but conventionally has one end attached to the interior of drum 15 and the other end attached to spindle 17 so that the stored energy tends to rotate said spindle 17 and gear 18 with respect to said drum 15 and casing 10.

The film driving mechanism also includes a gear 19 which is mounted upon a shaft 20 and which meshes with gear 18. Another large pinion gear 21 is mounted upon shaft 20 for rotation therewith.

A small pinion gear 22 is rotatably mounted within the mechanism chamber of the casing in mesh with large pinion gear 21. An off-set ring 23 is attached to gear 22 and has a plurality of knobs 24. A bell crank 25 is pivotally mounted upon a post 26, and is normally held in the position shown in Fig. 1 by a coil spring 27. The bell crank 25 has an arm 28 which extends through an opening 29 in mechanism plate 11 and which forms a claw 30 adapted to enter a film magazine and to engage the film perforations. The bell crank 25 has a second arm 31 which extends toward the off-set ring 23 and which may be operated by the knobs 24 on said ring 23.

A pulley 32 is mounted co-axially and is adapted to rotate with the small pinion gear 22. A slightly smaller pulley 33 is rotatably mounted with respect to mechanism plate 11 on a spindle 34' which engages take-up core 34 to drive the same. A spring belt 35 encircles pulleys 32 and 33 and since pulley 33 is somewhat smaller than pulley 32, said pulley 33 is rotated at a greater angular speed than pulley 32. This discrepancy in the size of the pulleys is to insure in the usual manner that the film take-up will operate faster than the film driving mechanism.

Another smaller pinion gear 36 is mounted upon a spindle 37 and meshes with said large pinion gear 21. A stop member such as a double toothed cam 38 is attached to spindle 37.

The supply of film is wound upon a supply core 39 which is rotatably mounted between the covers of the film magazine in known fashion and which is provided with a square opening 40 for engaging the take-up spindle 34' when the magazine is located in inverted position within the camera. The film F extends from the supply film roll on core 39, between a guideway 41 and the lateral wall 44' of the film magazine, around a film sprocket 42 which has trunnions 43 and which is rotatably mounted, as best shown in Fig. 3, between the side walls of the film magazine, through the film gate which is partially formed by shutter housing 13 and to the take-up film roll which is wound on the take-up core 34.

Upon operation of spring motor 14 the film driving mechanism comprising gears 18, 19, 21 and 22, the off-set ring 23, the bell crank 25 and pulleys 32 and 33 is operated. The film sprocket 42 draws the film from the supply roll on core 39 but the claw 30 holds the film from moving through the gate so that a small film loop is formed between claw 30 and film sprocket 42. When one of the knobs 24 engages arm 31 to remove claw 30 from the perforation, then the natural resiliency of the film moves the same through the gate and the claw 30 returns to engage the next perforation. The pulley 32 and spring belt 35 rotate core 34 at a peripheral speed which is greater than the peripheral speed of film sprocket 42 so that all the film passing claw 30 will be wound on said core 34.

This arrangement for film advancement is more fully described and disclosed in my United States Patent No. 1,994,586 for Magazine type of motion picture camera. It is to be understood, however, that any type of film advancing mechanism may be used and that the advantages of my invention are not dependent in the slightest degree upon the type of film movement which is employed. The construction thus far described is merely by way of providing a background or setting for the invention which will now be described in detail.

The film magazine is enclosed in a casing which includes a side wall 44 and a lateral wall 44' around the edge of side wall 44 while the cover 45 fits onto said lateral wall 44' to form the other side wall of the casing. The supply film roll 46 is wound upon the supply core 39 which is rotatably mounted between the side wall 44 and cover 45. As before mentioned the film sprocket 42, see Fig. 3, has trunnions 43 which extend through said side wall 44 of the casing and through cover 45 rotatably to support said film sprocket 42 within the magazine.

The indicating means of the invention includes a spindle 47 which extends transversely of the magazine and which is rotatably supported between the side walls of the magazine casing or between side wall 44 and cover 45. An arm 48 is fastened at one end to spindle 47 and at the other end supports an undercut roller 49. A coil spring 50 encircles spindle 47, has one end 50' riding on the center portion of film sprocket 42 and has the other end bearing on the arm 48 so that the undercut roller 49 is resiliently pressed against the outer convolution either of the supply film roll or the take-up film roll. When the unexposed film is provided originally and inserted as illustrated in Fig. 2 then roller 49 bears against the outer convolution of supply film roll 46.

As the camera is operated to expose film, the diameter of film roll 46 decreases and the diameter of the take-up film roll on core 34 increases. As the supply film roll 46 is decreased in diameter the arm 48 and roller 49 will swing in a clockwise direction as viewed from Fig. 2. The location and/or length of arm 48 may be selected so that the roller 49 will spring past the core 39 when the amount of film on said core 39 has reached a predetermined minimum, such as one or two convolutions. As before mentioned, the diameter of the film on the take-up core 34 has increased to an amount which may be indicated by the heavy dot-dash arc 46' in Fig. 2. During the first run of the film through the camera, the roller 49 will describe a path indicated by the heavier arcuate dot-dash arrow 51. During the second run of the film, the original take-up film roll becomes the supply film roll and decreases in diameter so that the roller 49 continues to follow the arcuate path in the manner indicated by the light dot-dash arrow 51' of Fig. 2. After the film roll has decreased to its predetermined minimum then the roller 49 will spring past core 34 and arm 48 will abut against pin 52 on side wall 44.

A disc member 53 carries a plurality of graduations 54 and is fastened to one end of spindle 47. Such attachment may be effected by providing a flat 55 at one end of spindle 47 and an opening with a flat side in member 53. A second disc member 56 has a plurality of graduations 57 and is attached to the other end of spindle 47 preferably in the manner just described with respect to disc member 53. Thus roller 49, arm 48, spindle 47, and disc members 53 and 56 will move as a unit with changes in diameter either of the supply film roll 46 or of the take-up film roll.

Masking devices such as masking plates 58 and 59 are located over respective disc members 53 and 56 on opposite sides of the magazine. Masking plate 58 is provided with a lower opening 60 and with an upper opening 61 while masking plate 59 is provided with similarly shaped and similarly located openings 62 and 63 respectively. Both masking plates 58 and 59 are provided with index marks such as the pointer 64, see Fig. 2, which extends into the opening 60 of plate 58 and for registering with the graduations 54 on disc member 53. The graduations 54 are calibrated with respect to unit lengths of film, such as feet of film, having corresponding numerals and progressing in a clockwise direction around disc member 53. Thus, with a decrease in the diameter of film roll 46 and movement of roller 49, arm 48 and disc 53 in a clockwise direction, the readings of film footage remaining may be observed with respect to the pointer 64. Upon depletion of film roll 46 and as previously described, roller 49 will spring past the core 39 and the directions "Reverse" appear in the opening 60.

The graduations 57 on disc member 56 also have corresponding numerals which progress in a clockwise direction as viewed from Fig. 4 but which progress in a counter-clockwise direction when said disc member 56 is on the top during inverted position of the magazine. The graduations 54 and the graduations 57 are angularly displaced with respect to each other by an amount such that when the word "Reverse" appears in the opening 60 of masking plate 58 then the graduation corresponding to numeral "25" is visible through the opening 62 in masking plate 59. As the diameter of the new supply film roll, which was formerly the take-up film roll, decreases, the roller 49 continues to swing along the path designated by the dot-dash arrows 51' and the known designations of decreasing order pass the opening 62. When the film is exhausted from core 34 and roller 49 has swung around so that arm 48 is against pin 52, then the directions "End of film" may may be observed through the opening 62. Thus far an indicating means including two graduated members, one for designating depletion of one film roll and the other for designating depletion of another film roll has been described. The co-operation of these members with a control means will next be explained.

The double toothed cam 38 constitutes a stop member connected to the film driving mechanism and which upon being blocked will stop said film driving mechanism. A beam member 65 is intermediately and pivotally mounted on a fulcrum 65'. One end of beam member 65 may move into engagement or abutment with either tooth on cam 38 while the other end of beam member 65 carries a projection 66. The projection 66 extends through a hole 67 in the mechanism plate 11 and may abut against the surface of disc member 53 or disc member 56. The beam member 65 is normally urged into a position in which one end will block cam member 38 to stop the film driving mechanism by a leaf spring 68 which is riveted to the lower surface of mechanism plate 11 and which bears against the beam member 65.

With a newly loaded magazine, the disc member 53 is in the position shown in Fig. 2 and upon insertion of the film magazine into the camera the disc member 56 will bear against projection 66 to move beam member 65 out of engagement with cam 38. This condition is partially shown at the right of Fig. 3. The camera may be now operated in the usual way by means of a release of conventional type, not shown.

The disc member 53 is provided with an arcuate slot 69 while the disc member 56 is provided with an arcuate slot 70. Arcuate slot 70 is so located or so angularly displaced with respect to the graduations 54 on disc member 53 that when the direction "Reverse" registers with opening 60 the said slot 70 is in register with the opening 63 of the masking plate 59 now on the rear of the film magazine. When the supply film roll has decreased to the predetermined diameter, then as just explained, slot 70 registers with opening 63 and leaf spring 68 may move projection 66 through said slot 70 and the other end of beam member 65 will block the toothed cam 38. Thus the film moving mechanism is automatically stopped when the quantity of film on the supply film roll 46 has decreased to predetermined value.

The camera cannot be operated under this condition and cannot be operated if the film magazine is removed and erroneously replaced in the same upright position. During this initial run of the film, the arcuate slot 69 has been in registration with the opening 61 in masking plate 58 so that if the film magazine has been removed and inverted prior to completion of the initial run of the film, then the film driving mechanism could not have been operated because projection 66 would have extended through slot 69 and cam 38 would have been blocked. However, after completion of the initial film run, arcuate slot 69 is no longer in registration with opening 61 and upon inversion of the film magazine, disc member 53 will bear upon projection 66 and move beam member 65 against the action of leaf spring 68 so that toothed cam 38 is unblocked.

The camera is now in condition for the second run of the film during which the graduations 57 on disc member 56 pass the opening 62 in masking plate 59. Upon completion of this second run, the arcuate slot 69 of disc member 53, which is now adjacent the mechanism plate 11, will move into registration with opening 61 and projection 66 will move through the arcuate slot 69 of disc member 53 and again the beam member 65 will be moved by leaf spring 68 to block toothed cam 38.

In order to prevent double exposure of the film by re-inversion of the magazine for a third run of the film, the disc member 56 is provided with another opening 71 which is located so as to register with the upper opening 63 in masking plate 59 when the legend "End of film" is visible through the lower opening 62. Thus after the two runs and complete exposure of the film, arcuate slot 69 is in registration with the opening 61 in masking plate 58 and slot 71 is in registration with the opening 63 in masking plate 59 so that in either the upright or inverted position of the magazine the projection 66 is not engaged and beam member 65 remains in normal position to block one tooth of cam 38.

From the foregoing disclosure, it will be readily recognized that the co-operation of the footage indicator of the invention with a control means for supervising the film driving mechanism completely safeguards the camera operation against double exposure of the film and against only partial exposure thereof. The disc members of the indicating means in addition to providing footage designations also cooperate with the control means of the camera so that operation cannot be effected in the same position after either run of the film has been completed or in either position of the magazine after both runs have been completed.

Other alterations and modifications of the indicating means and of its co-operation with the film driving mechanism may be made without departing from the spirit or scope of the invention. The present disclosure is merely illustrative and the scope of the invention is defined in the claims that follow.

Having now particularly described my invention what I desire to secure by Letters Patent of the United States and what I claim is:—

1. In a photographic apparatus provided with a film chamber, the combination with a film magazine adapted to contain a supply of film and adapted to be inserted into said film chamber, film moving mechanism for advancing film through said apparatus and magazine, and a stop member connected to and adapted upon being blocked to stop said film driving mechanism, of a control means positioned for movement into and out of engagement with said stop member and controlled by a portion of said film magazine to be moved out of engagement with said stop member when the film magazine is placed within said film chamber.

2. In a photographic apparatus, including a pair of film rolls which are rotatably mounted, the combination with film driving mechanism for moving the film from one film roll to the other film roll, and a stop member connected to and adapted upon being blocked to stop said film driving mechanism, of an indicating means movable to positions corresponding to the diameter of one of said film rolls, a control means on said apparatus and having a portion movable into a blocking position to engage said stop member, and a member on said indicating means for holding said control means out of blocking position.

3. In a photographic apparatus, including a pair of film rolls which are rotatably mounted, the combination with film driving mechanism for moving the film from one film roll to the other film roll, and a stop member connected to and adapted upon being blocked to stop said film driving mechanism, of an indicating means including an arm movably mounted for engagement with the outer convolution of one of said film rolls, a control means on said apparatus and having a portion resiliently urged into a blocking position to engage said stop member, and a member on said indicating means for holding said control means out of said blocking position.

4. In a photographic apparatus, including a pair of film rolls which are rotatably mounted, the combination with film driving mechanism for moving the film from one film roll to the other film roll, and a stop member connected to and adapted upon being blocked to stop said film driving mechanism, of an indicating means including an arm movably mounted for engagement with the outer convolution of one of said film rolls, a control means on said apparatus, having a portion movable into a blocking position to engage said stop member and having another portion, a member on said indicating means movable to a predetermined position and to other positions all corresponding to the diameter of one of said film rolls and for engaging in said other positions only the second portion of said control means to hold first said mentioned portion thereof out of blocking position, and a resilient means operating said control means and normally urging the first mentioned portion thereof into said blocking position only when said member on the indicating means is in said predetermined position.

5. In a photographic apparatus, including a pair of film rolls which are rotatably mounted, the combination with film driving mechanism for moving the film from one film roll to the other film roll, and a stop member connected to and adapted upon being blocked to stop said film driving mechanism, of an indicating means including a member movable to positions corresponding to the diameter of one of said film rolls and provided with an opening, a control means on said apparatus having a portion movable into a blocking position to engage said stop member, and having a projection adapted to engage the member of said indicating means during which engagement said portion is held out of blocking position and a resilient means engaging said control means, for urging said projection into the opening in the member of said indicating means and for moving said portion of said control means into blocking position.

6. In a motion picture camera provided with a magazine chamber, the combination with a film magazine adapted to contain a pair of film rolls and adapted to be located within said chamber either in an upright or an inverted position, film driving mechanism for moving the film from one film roll to the other film roll, and a stop member connected to and adapted upon being blocked to stop said film driving mechanism, of an indicating means on said magazine and including an arm movably mounted and for engaging the outer convolution of either film roll, and including a pair of members connected to said arm and movable to positions corresponding to the diameter of the engaged film roll, and a control means on said camera, having a portion movable into a blocking position to engage said stop member but held out of said blocking position by either member of said indicating means.

7. In a motion picture camera provided with a magazine chamber, the combination with a film magazine adapted to contain a pair of film rolls and adapted to be located within said chamber either in an upright or an inverted position, film driving mechanism for moving the film from one film roll to the other film roll, and a stop member connected to and adapted upon being blocked to stop said film driving mechanism, of an indicating means on said magazine and including an arm movably mounted and for engaging the outer convolution of either film roll, and including a pair of members connected to said arm, movable to positions corresponding to the diameter of the engaged film roll, and each provided with an opening, and a control means on said camera having a portion movable into a blocking position to engage said stop member, and having a projection adapted to engage one member of said indicating means in upright position of said magazine, to engage the other member of said indicating means in inverted position of said magazine, during either of which engagements said portion is held out of blocking position, and adapted to enter the opening of the engaged member of said indicating means to permit movement of said portion to blocking position.

8. In a motion picture camera provided with a magazine chamber, the combination with a film magazine adapted to contain a pair of film rolls and adapted to be located within said chamber either in an upright or an inverted position, film driving mechanism for moving the film from one film roll to the other film roll, and a stop member connected to and adapted upon being blocked to stop said film driving mechanism, of an indicating means on said magazine and including an arm movably mounted and for engaging the outer convolution of either film roll, and including a pair of members connected to said arm, movable to positions corresponding to the diameter of the engaged film roll, and each provided with an opening, and a control means on said camera having a portion movable into a blocking position to engage said stop member, and having a projection adapted to engage one member of said indicating means in upright position of said magazine and to engage the other member of said indicating means in inverted position of said magazine, during either of which engagements said portion is held out of blocking position, and adapted to enter the opening of the engaged member of said indicating means to permit movement of said portion to blocking position, the opening in respective members being located to allow said portion to move to blocking position when the film on the corresponding film roll has attained a predetermined diameter.

9. In a motion picture camera for exposing laterally adjacent and longitudinally extending portions of a film and provided with a magazine chamber, the combination with a film magazine having opposed side walls, adapted to contain a pair of film rolls, and adapted to be located either in an upright position or an inverted position within said magazine chamber with only one side wall visible, and a film moving mechanism for moving film from one film roll to the other film roll in either position of said magazine, of an indicating means including an arm movably mounted and for engaging the outer convolution of either film roll, including a graduated member on one side of said magazine and connected for movement with said arm and visible during the upright position of the magazine within said chamber, and including a second graduated member on the other side of said magazine and also connected for movement with said arm and visible during the inverted position of the magazine within said chamber.

10. In a film magazine, the combination with a casing having opposed side walls and adapted to contain a pair of film rolls rotatably mounted therebetween, of an indicating means on said casing including an arm movably mounted within said casing and adapted to engage the outer convolution of either film roll, a member having graduations and adjacent one wall, and a second member having graduations and adjacent the opposite wall, both of said members being connected to and movable with said arm, an index mark on one side of said casing and adapted to register with the graduations on one of said members of the indicating means only when said arm is in engagement with the outer convolution of one film roll, and a second index mark on the opposite side of said casing and adapted to register with the graduations on the other member of said indicating means only when said arm is in engagement with the outer convolution of the other film roll.

11. In a film magazine, the combination with a casing having side walls and adapted to contain a pair of film rolls either of which may serve as the supply film roll, of a pair of indicating members each adjacent one of said side walls of the casing, an actuating means adapted to engage either one of said film rolls, movable to positions corresponding to the diameter of the engaged film roll, and for moving said indicating members, and a pair of sets of graduations and a pair of index marks on respective indicating members and respective sides of said casing and arranged to register with the corresponding index mark only when said actuating means is engaging the film roll which is at that time serving as the supply film roll.

12. In a film magazine, the combination with a casing having opposed side walls and adapted to contain a pair of film rolls rotatably mounted therebetween, of an indicating means on said casing including an arm movably mounted and for engaging the outer convolution of either film roll, including a pair of members located on opposite sides of said casing and both connected for movement with said arm, and including a plurality of graduations on each member, and a masking device for covering each member but each provided with an opening through which the graduations on said member can be observed, the graduations on each member and the opening in each masking device being located and arranged so that only the graduations on one member can be observed when said arm is in engagement with one film roll and so that only the graduations on the other member can be observed when said arm is in engagement with the other film roll.

13. In a film magazine, the combination with a casing having opposed side walls and adapted to contain a pair of film rolls rotatably mounted therebetween, of an indicating means on said casing including an arm movably mounted and for engaging the outer convolution of one film roll and adapted upon predetermined change in diameter of said one film roll to move into engagement with the other film roll, including a pair of members located on opposite sides of said casing and both connected for movement with said arm, and a plurality of graduations on each member, and a pair of masking plates each located on opposite sides of the casing to cover one of said members and each provided with an opening, said openings being in alignment with each other, the plurality of graduations on one member being angularly displaced with respect to the graduations on the other member.

14. In a film magazine, the combination with a casing having opposed side walls and adapted to contain a pair of film rolls rotatably mounted therebetween, of an indicating means on said casing including an arm movably mounted and for engaging the outer convolution of one film roll and adapted upon predetermined change in diameter of said one film roll to move into engagement with the other film roll, including a pair of members located on opposite sides of said casing and both connected for movement with said arm, and a plurality of graduations on each member, and a pair of masking plates each located on opposite sides of the casing to cover one of said members and each provided with an opening, said openings being in alignment with each other, the plurality of graduations on one member being angularly displaced with respect to the graduations on the other member and arranged so that during engagement of said arm with one film roll only the graduations on one member can be observed through the opening in the adjacent masking plate.

15. In a film magazine, the combination with a casing having opposed side walls and adapted to contain a pair of film rolls rotatably mounted therebetween, of an indicating means on said casing including an arm movably mounted and for engaging the outer convolution of one film roll and adapted upon predetermined change in diameter of said one film roll to move into engagement with the other film roll, including a pair of members located on opposite sides of said casing and both connected for movement with said arm, and a plurality of graduations on each member, and a pair of masking plates each located on opposite sides of the casing to cover one of said members and each provided with an opening, said openings being in alignment with each other, the plurality of graduations on one member being angularly displaced with respect to the graduations on the other member and arranged so that during engagement of said arm with one film roll only the graduations on one member can be observed through the opening in the adjacent masking plate, and so that during engagement of said arm with the other film roll only the graduations on the other member can be observed through the opening in the other masking plate.

JOSEPH MIHALYI.